United States Patent
Forrest

[11] Patent Number: 5,913,373
[45] Date of Patent: Jun. 22, 1999

[54] DUAL-POLE, DUAL-WHEEL PERSONAL TOWING VEHICLE

[76] Inventor: Kenneth Roy Forrest, 28030 Natoma Rd., Los Altos Hills, Calif. 94022

[21] Appl. No.: 09/053,189

[22] Filed: Apr. 1, 1998

Related U.S. Application Data

[63] Continuation-in-part of application No. 08/567,459, Dec. 5, 1995, Pat. No. 5,735,361.

[51] Int. Cl.$^6$ .............................. B62D 51/04; B62M 27/02
[52] U.S. Cl. .......................... 180/6.2; 180/19.1; 180/6.48; 180/180
[58] Field of Search ................................... 180/19.1, 19.2, 180/19.3, 6.2, 6.44, 6.48, 6.5, 180, 165, 6.24, 9.1, 9.21, 9.22

[56] References Cited

U.S. PATENT DOCUMENTS

| | | | |
|---|---|---|---|
| 2,369,936 | 2/1945 | Barth et al. | 180/6.2 |
| 3,791,469 | 2/1974 | Prosser et al. | 180/6.2 |
| 5,385,210 | 1/1995 | Harvey | 180/180 |

FOREIGN PATENT DOCUMENTS

| | | | |
|---|---|---|---|
| 2319618 | 11/1974 | Germany | 180/19.2 |
| 991730 | 5/1965 | United Kingdom | 180/19.2 |

*Primary Examiner*—Brian L. Johnson
*Assistant Examiner*—Gary Savitt
*Attorney, Agent, or Firm*—Townsend and Townsend and Crew LLP; Kenneth R. Allen

[57] ABSTRACT

A personal traction transportation vehicle which includes two pulley-motor-wheels which drive a connected chassis forward. The chassis is stabilized by a connection to a drag pole which is controlled by the operator. The vehicle is electrically driven by a removable battery pack. At least one drag pole of the two simulated ski poles is attached to the chassis through joints in a manner allowing the handles of the ski poles to be free to move in the plane normal to the direction of forward movement. The other drag pole can be connected through a universal joint. The vehicle is steered by differentially pulling on the drag poles. The user is not restricted in the typical operating range of vertical movement the stabilizing pole, since the chassis is able to rotate within broad constraints about the axis of the drive wheels. The linkage between the stabilizing pole and the chassis allows for freedom of movement only laterally on a horizontal axis via a "forked" link: the forked link provides a means of stabilizing the chassis by creating a vertically rigid link between the drag pole and the chassis. Notwithstanding the evident restriction on movement of one of the drag poles (due to ballast and torque due to acceleration and deceleration), the lateral movement of either drag pole relative to its point of contact with the drive assembly does not affect steering, and the countertorque required to maintain chassis stability is minimal.

7 Claims, 4 Drawing Sheets

DUAL-POLE, DUAL-WHEEL PERSONAL TOWING VEHICLE

CROSS REFERENCE TO RELATED APPLICATIONS

This application is a continuation-in-part patent application to patent application Ser. No. 08/567,459 filed Dec. 5, 1995, now U.S. Pat. No. 5,735,361 issued Apr. 7, 1998 entitled DUAL-POLE PERSONAL TOWING VEHICLE, the content of which is incorporated herein.

BACKGROUND OF THE INVENTION

1) Field of the Invention

This invention relates to personal transportation for pulling a user over a variety of base surfaces. More particularly the invention relates to a traction vehicle for pulling a user on in-line skates, skis or ice skates or the like through hand grips to transmit pulling forces to the user while permitting steering.

2) Prior Art

Other pulling vehicle systems are known in the art. Prior art known to Applicant as a result of prior examination and searches are U.S. Pat. Nos. 3,791,469; 5,540,296; 3,826,323; 2,369,936; 3,412,821; 3,419,095; 3,444,945; 2,645,297; 3,557,893; 3,380,546; 4,645,022; 5,090,714; 5,385,210; 4,456,089; 3,750,777; 3,797,448; 4,109,732; 3,826,323; 4,096,919; 3,777,835; 5,025,876; 3,635,301; 3,193,038; 4,418,776; 5,211,254; German Offenlegungsschrift 2,319,618; and Great Britain Patent Specification 991,730.

Of particular interest is U.S. Pat. No. 5,385,210 which pertains to a motorized device for pulling a user on inline skates. This vehicle consists of a single wheel with two batteries that sit fore and aft of a single wheel; in addition, two poles with handles extended outward for steering. Though the vehicle will assist a skater under ideal conditions, numerous problems will arise when the user or environment is altered. This is explained as follows:

A) Because the vehicle has only one central wheel and is balanced at the point of tire contact with the road, it is the user who must always maintain the balance of the vehicle.

Maintaining this balance could be an impossible task if the vehicle is traversing a sloped surface or if the user does not have sufficient body strength to overcome a vertical shifting of handle position, e.g., going down a hill.

B) While the object of a pulling or towing vehicle is to provide a means of forward movement, it should also provide the user a means of resistance (to move in opposition to), to assist the balance of the user. If the vehicle has a shifting center of momentum, as the single wheel vehicle does, then its ballast and resistance can not be relied upon in all instances to balance the user. If, for example, negotiating a turn on level ground, centripetal force causes the vehicle and user to become unbalanced in the same vector direction, the single wheeled vehicle will tip in the same direction as the user, thus further aggravating his/her imbalance.

C) Steering a single-wheeled vehicle is difficult because it assumes the user has sufficient strength, balance and control to oppose the forces needed to maneuver an object. Since the steering requires a sufficiently strong and balanced user, it follows that if the user is not balanced, the steering will be inaccurate.

D) The above liabilities are proportional to the weight of the vehicle. This becomes an added problem since the desired power and performance of electric vehicles are directly dependent upon battery capacity; batteries are usually the single heaviest component of an electric vehicle.

E) The pole handles or grips are affixed to the vehicle, which limit the user's freedom of movement—especially in the arms, shoulders and torso.

F) The poles need proper adjustment to fit the height of the user. It follows, therefore, that the poles go out of adjustment as the user bends and straightens his/her legs.

Simply stated, this design does not optimize control and maneuverability.

Another prior art vehicle system is found in U.S. Pat. No. 3,791,469 and is designed for skiers. This vehicle uses a gas-driven engine with a differential and four drive wheels. Using it along a city street or in the back-country will not be as "environmentally" pleasing as using an electric pulling vehicle. This art has only a single handle, which again restricts movement of the arms, shoulders and upper torso, nor does it allow the arms to move independently. Furthermore, steering is accomplished by only one means and that is by braking one wheel at a time through cable operated disc brakes. This method is not only inefficient and heavy, but the braking ability of a tire on a snow surface to turn a vehicle is not nearly as effective as the applicant's pulling vehicle which has three distinct methods of steering, and which all can be used simultaneously.

Other references uncovered include GB 991,730 in which a tiller-controlled vehicle is disclosed wherein movement of the tiller side-to-side affected steering.

SUMMARY OF THE INVENTION

According to the invention, a personal traction vehicle is provided for pulling a user, such as a skater, skier, skateboarder, or pedestrian, through drag poles which stabilize the user and permit directional steering without affecting balance of the user. The vehicle comprises a chassis, at least one and preferably two drag poles with ski-pole-like grips preferably incorporating a steering mechanism in each grip and coupled to the chassis through at least one and preferably two corresponding universal linkages by which steering is effected without restricting lateral hand and torso movement of the user. The vehicle further includes drive wheels, or drive tracks, depending on the surface, preferably two front parallel drive wheels attached to the chassis with a motor system, preferably an electric motor set of two motors, each of which preferably provides independent power to each drive wheel. Electric motors may be powered by a battery disposed between the drive wheels. In the version that employs drive wheels, a pair of bumper wheels is provided in front of the drive wheels to allow a rolling contact point at the front of the vehicle in the event that it is temporarily inclined forward due to unusually uneven terrain and/or lifting action by the user.

A universal linkage is provided between only one of the drag poles and the chassis. The universal linkage, or U-joint, gives stability to the user in the direction of travel while allowing the control grips to be moved independently of one another in a plane normal to the direction of travel, while one is limited in its vertical movement to the extent it is used to provide stability to the chassis. However, the user is not restricted in the typical operating range of vertical movement of the stabilizing pole, since the chassis is able to rotate within broad constraints about the axis of the drive wheels. The linkage between the stabilizing pole and the chassis allows for freedom of movement only laterally on a horizontal axis via a "forked" link: the forked link provides a means of stabilizing the chassis by creating a vertically rigid link between the drag pole and the chassis. Notwithstanding the evident restriction on movement of one of the drag poles (due to ballast and torque due to acceleration and deceleration), the lateral movement of either drag pole relative to its point of contact with the drive assembly does not affect steering, and the countertorque required to maintain chassis stability is minimal.

Steering can be effected by differentially loading the drive wheels by pulling one side more than the other via the drag poles. Additional load-bearing capability can be provided through a harness adapted to be attached to the torso, so that loading through the drag grips to the arms can be reduced or eliminated.

The personal traction vehicle according to the invention has many optional uses. An electric motor at each drive wheel provides a clean, quiet, and compact option for short distance commuting. Nevertheless, small fuel-powered engines are within the contemplation of the invention. With the vehicle equipped with a luggage compartment or carrying rack and strong headlights for night travel, a commuter can "ski" to and from work. Used in the form of recreation, the personal traction vehicle enhances an inline skating experience by providing a means of resistance to assist the skater in balancing in the least stable direction, the direction of travel. A novice skater can easily learn to skate by using the pulling vehicle because he/she never has to lift a skate, let alone push the skate from side to side for acceleration; his/her skates are firmly planted on the ground at all times. As the skater advances in skill, he/she may use the pulling vehicle as only an intermittent assist. Thus inline skating is just as much of an aerobic workout as before, but balancing and accelerating assistance "on the fly", is available. In addition to the novice skater, a more advanced skater using the vehicle can travel long distances and at high speeds without tiring. An important application of the vehicle is that the design allows the user who wears inline skates to mimic the correct body movements of an alpine or telemark snow skier.

This pulling vehicle is specifically designed to simulate the downhill skier's movements in a realistic way. Downhill skiers will appreciate that by inline skating down hill, the correct body movements of snow skiing can be mimicked almost identically. Replacing down-hill acceleration (caused by gravity) with an electromechanical acceleration allows a user to glide ski on virtually any terrain. Using studded tires or tracks on the drive wheels, a user on ice skates or on skis may also be propelled across ice or snow.

Key features of the pulling vehicle which allow the user to mimic the movements of a "skier" are:

1) The weight of the contents of the chassis of the pulling vehicle is balanced over the wheel axis on level ground so that minimal effort is required by the user to maintain balance and stability of the vehicle by use of the stabilizing pole. The design provides a wide range of comfortable hand/arm positions without sacrificing the stability and balance of the vehicle.

2) Two ski pole-like drag poles which provide the pulling force to the user, are mounted in such a way that the user has nearly a complete and independent range of movement in the arms, shoulders and chest (except in the plane of pulling fore and aft, and on one drag pole for minimal rotational control).

3) The pulling vehicle steers without significantly impinging on the skier's freedom of movement, nor does the vehicle's steering alter the "correct" body positioning required of the skier (a "skier" turns from the waist down, keeping the shoulders perpendicular to the "fall line" of the slope).

4) The connection between the ski poles and the chassis allows the ski pole handles or grips to move freely laterally. Therefore, the poles are positioned correctly for virtually any size user and can be adjusted readily to any changes in height which occur over hilly terrain. Virtually no forces from the vehicle can be transmitted back to the skater/skier, except for the forward pulling forces and braking forces.

The invention provides the user:
1) a powerful, quiet and efficient pulling force
2) a means of stability and balance
3) precise control and maximum performance during operation
4) minimum effect on the body's natural movements and flexibility.

The vehicle's design also offers a "user-friendly" portability which makes transporting and handling the device easy. The central battery case houses the batteries and electronics, and is equipped with receptacles that receive the motor and throttle/switch plugs. When the plugs are disconnected, the entire case slides out from its rack and may be carried by its handle. In addition, the drag poles "telescope" and fold across the chassis, providing increased portability, as well as ease of storage.

The invention will be better understood by reference to the following detailed description in connection with the accompanying drawings.

DESCRIPTION OF SPECIFIC EMBODIMENTS

Figure 1:
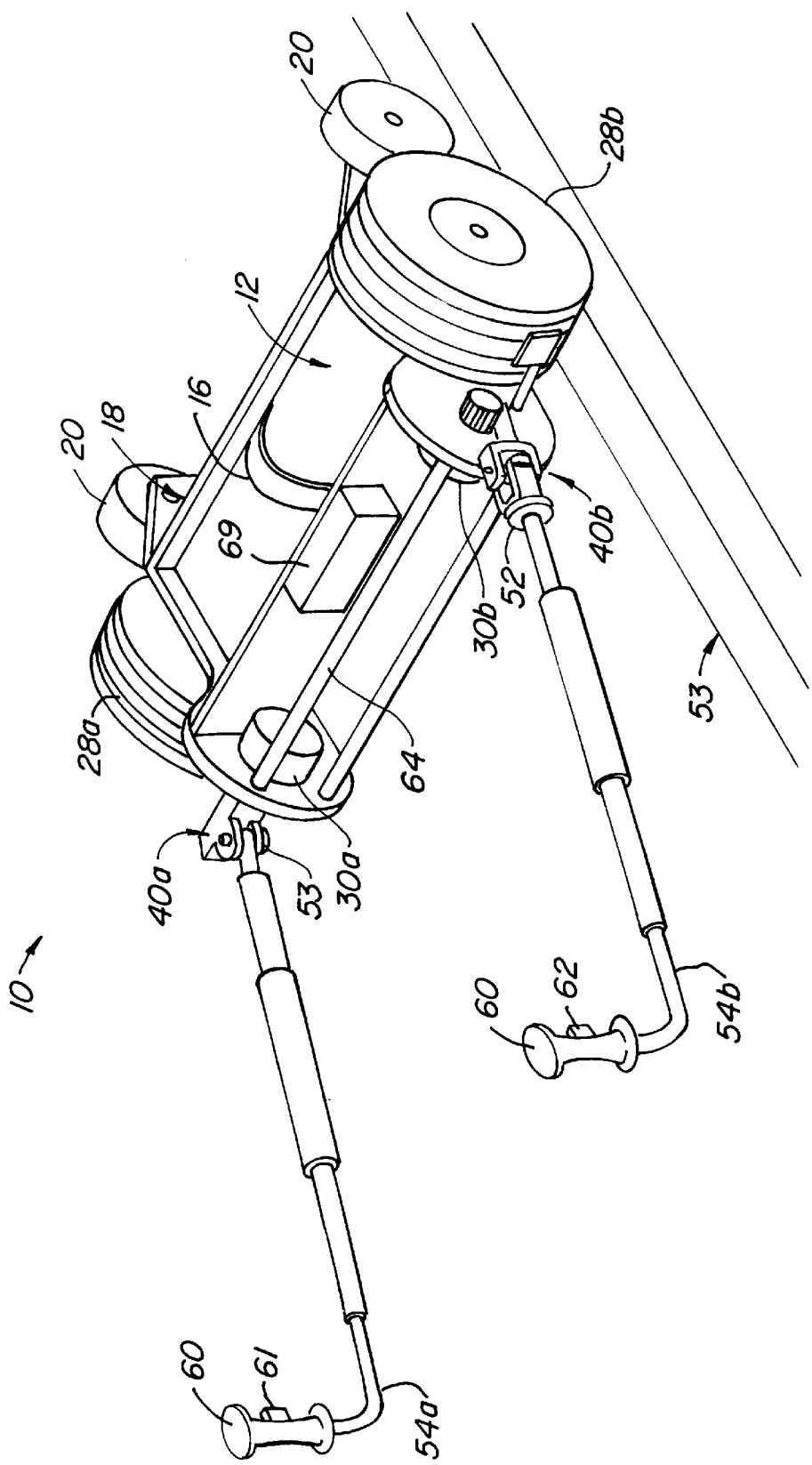
FIG. 1 is an isometric view of a personal traction vehicle for use on hard surfaces according to the invention.
Figure 2:
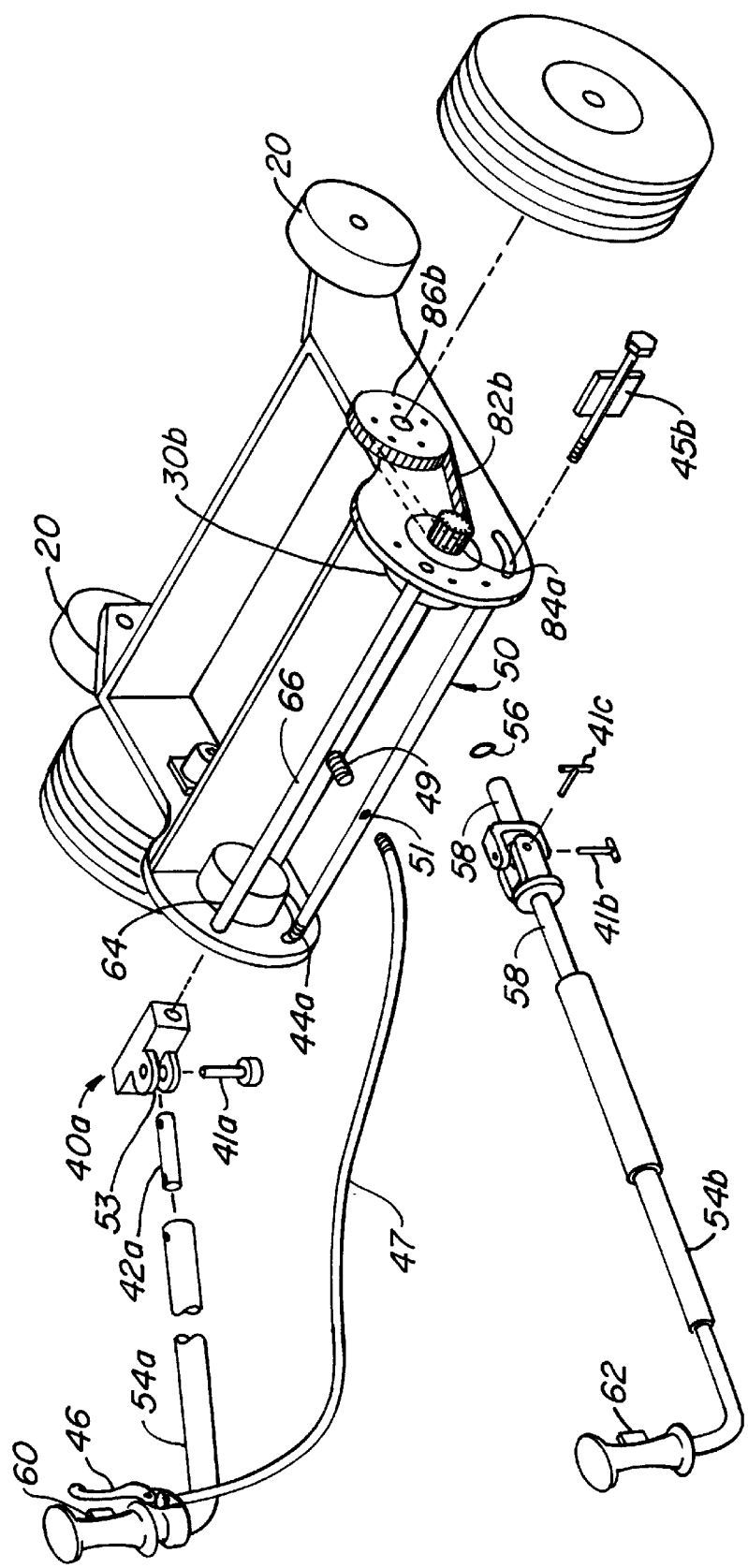
FIG. 2 is an exploded isometric view of the personal traction vehicle which illustrates the steering system and the battery case.
Figure 4:
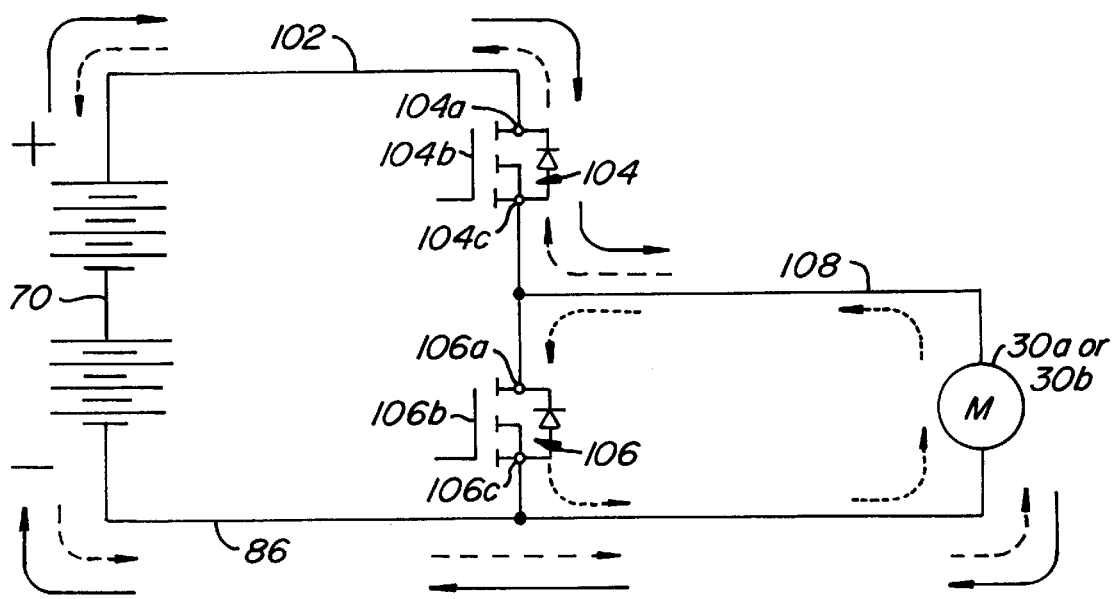
FIG. 4 is a wiring diagram of the vehicle's electrical power flow during its driving and regenerative braking modes.

FIG. 1 shows the dual-wheel, dual-pole personal traction vehicle 10 according to the invention, while FIG. 2 shows the vehicle 10 in exploded view form. It is capable of pulling any type of user wearing or using ice skates, skis, roller skates, inline skates, skateboards or the like. A battery case 12 with carrying handle 16 sits in the chassis 18 between two drive wheels 28a & 28b. Pole mounting brackets 40a & 40b are affixed to the main-frame connecting bar 64 through the chassis 18. The right mounting bracket 40b includes a universal joint 52 which affixes to the right drag pole 54b. The left mounting bracket 40a includes a "forked" joint 53 which affixes to the left drag pole 54a. On the raised ends of the drag poles 54a and 54b are the drag pole grips 60. In one design variation the right drag pole grip 60a houses the control throttle trigger switch 62. Braking is accomplished by mechanical means 45a, 45b, 46, 47, 49, 50, 51. (See FIG. 2.) In a design variation both the left and right drag pole grips 60a and 60b house control throttle trigger switches 61, 62: the right trigger switch 62 might control the acceleration of the motors (either together or via switches on each handle) while another left trigger switch 61 might control the regenerative braking, of which FIG. 4 is a schematic diagram.

FIG. 2 shows the left pole mounting bracket 40a with a restricted vertical movement joint 53 as pulled away from the chassis 18 and from the mainframe connecting bar 64. Joint 53 is designed to be able to rotate about an axis which is generally vertical to the ground in a plane including the main frame connecting bar 64. A left pole connecting pin 41a affixes the left drag pole 54a to the left pole mounting bracket 40a allowing the left pole to be moved in a plane normal to the direction of movement of the vehicle. No steering is produced by the mere lateral movement of either pole. Right pole connecting pins 41b and 41c affix the right drag pole 54b to the right pole mounting bracket 40b allowing universal movement of the right grip without impact on the rotational orientation of the chassis.

In a design variation, a mechanical braking system is used. The left drag pole 54a employs a hand brake 46 located near the left drag pole grip 60. A hand brake cable 47 connects the hand brake 46 to the brake bar 50 via a threaded hole 51. The inner cable of the hand brake cable travels through the threaded hole 51 and spring 47, connecting to the chassis 18. Nylon bushings 44a and 44b are attached to either end of the brake bar and fit into slots on either side of the chassis 18. In FIG. 2 right brake pad assembly 45b is shown separated from the brake bar 50. (Left brake pad assembly 45a is not shown; it is a mirror image of element 45b.) Brake pad assemblies 45a and 45b are bolted through chassis slots to the brake bar 50. Application of pressure to the hand brake 46 applies equal amounts of pressure to the left and right wheels at the brake pads 45a 45b. In an alternative embodiment (FIG. 1), a regenerative electrical braking system is used, as discussed below. (See FIG. 4)

The drive mechanism for the right wheel is shown in FIG. 2 as follows: the drive pulley 32 is attached to the axle of the right motor 30b, which is itself bolted to the side of the chassis 18. The timing belt 31 connects the right drive pulley 32 to the right driven pulley 34, which is in turn rigidly fastened to the right drive wheel 28b, (shown here separated from the driven pulley). The driven pulley/wheel assembly is then bolted to the chassis through the wheel bearing hole. Configuration of the left drive train is mirror-image identical to that of the right drive train.

Figure 3:
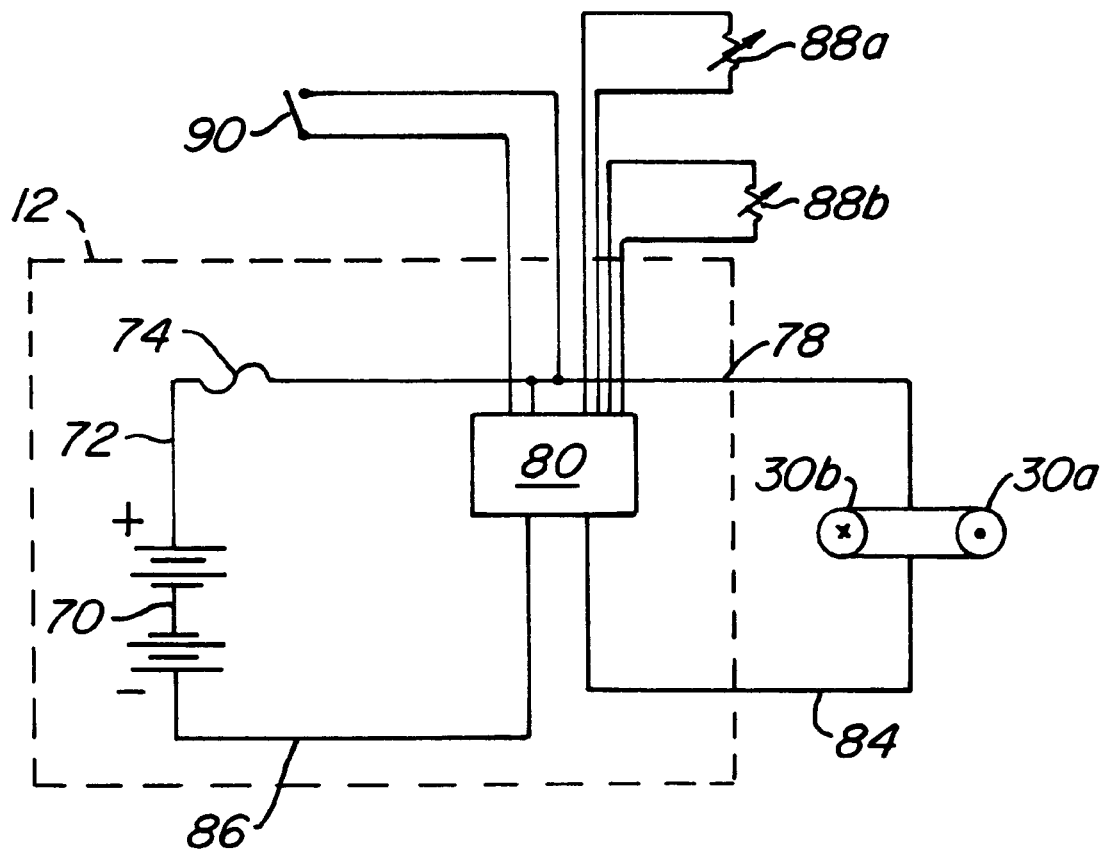
FIG. 3 is the wiring diagram of the vehicle's power components using a single motor controller.

FIG. 3 is the wiring diagram of the vehicle's power components using a single motor controller. Battery pack 70 connects to wire 72 through breaker/fuse 74. Positive battery voltage is measured on wire 78 and connects to key switch 90, motor speed controller 80, and motors 30a & 30b. Wire (motor negative) 84 connects the motors 30a & 30b with controller 80. Wire (battery negative) 86 connects the controller 80 with battery negative 86. Wire (battery positive) 78 also connects to the controller 80, via the key switch 90. The rheostat 88a is located in the throttle trigger/switch in the right drag pole 54b, and in a design variation rheostat 88b is located in the throttle trigger/switch in the left drag pole 54a. Each rheostat connects to the controller 80. Rheostat 88a is wired to the controller so that increasing the pressure on the right pole trigger 62 accelerates the pulling vehicle. In the regenerative braking design variation, rheostat 88b is wired to the controller so that increasing the pressure on the left pole trigger 62 causes regenerative breaking of the pulling vehicle (See FIG. 4). The dash-lined rectangular box represents the battery box 12 and thus shows the electrical hardware enclosed within this case.

FIG. 4 illustrates the electrical braking system used for the regenerative braking design variation. The electrical power flow is shown with the four main components that allow the vehicle to accelerate forward and brake regeneratively. The batteries 70 have a positive wire connection 102 that connects to the "drive" power transistor 104 at its drain connection 104a. The drive transistor's gate connection 104b connects to the throttle's rheostat 88b (of FIG. 3). The braking transistor's gate connection 106b connects to the rheostat 88a (of FIG. 3). The drive transistor's source connection 104c connects to the motors 30a & 30b, as well as the drain of the "regenerative braking" power transistor 106a, all through the wire (motor positive) 108. Wire (battery negative) 86 connects three components together: the motors 30a & 30b, the source terminal of transistor 106, at 106c, and the battery pack 70. Solid-lined directional arrows 110 show the flow of circuit current when the motors are driving the vehicle. Dashed-lined directional arrows 112 show the motor's armature induction build-up of current. The dashed-lined directional arrows 114 illustrate the flow of circuit current when the motors are braking and recharging the batteries.

Two of the key features of the vehicle are compactness and portability. The drag poles are preferably telescope-type and can be folded around the rear of the chassis, allowing the machine to be easily transported in a trunk of a car or stored in a closet. In addition, the vehicle can be broken down into three main pieces, namely, drag poles, battery case and chassis.

Not shown, but part of this assembly, is the vehicle's cowling or body shell; the cowling not only covers and protects all the components, but improves the aerodynamics and appearance of the pulling vehicle.

Motor Speed Controllers of conventional design are available, such as pulse width modulation (PWM) types. These controllers are in numerous consumer goods, such as cordless power tools, forklifts and wheelchairs. They are commercially available, for example, from Curtis PMC of Dublin, Calif.

OPERATION OF INVENTION

On Pavement or Hard Road Base Surfaces

The pulling vehicle 10 can pull an individual who may wear ice skates, skis, roller skates, inline skates, who is walking or hiking, or who rides a skateboard or in a wheelchair or in any other type of support system. Pictured in FIG. 2 is the right drive wheel 28a as a racing slick "go-cart" tire. Two bumpers 20, which may be able to rotate, are mounted at the front of the chassis to allow an intermittent rolling contact point at the front of the vehicle in the event that it is temporarily inclined forward due to unusually uneven terrain, rapid braking and/or lifting action by the user. For example, the tires 28a and 28b are sufficiently large and bumpers 20 are positioned sufficiently far enough away from the front of the vehicle so that the tires 28a and 28b and bumpers 20 can work together to "climb" onto curbs, over sidewalks and up stairs. For this purpose, the left drag pole can be manipulated to tilt the carriage as well as to provide stability to the carriage with a minimum of effort, since the weight of the chassis elements is substantially equally distributed in front of and behind the drive wheel axis. This design allows maximum flexibility in controlling the vehicle as well as an automatic and infinite variation of ski pole grip positions for any size operator of the vehicle.

Although this type of tire construction is ideal for pavement, it may be replaced with other tire or traction types depending upon the base surface environment (see "Preferred Pulling Vehicle Snow Base Surface" & "Preferred Pulling Vehicle on Ice, Snow and Dirt Base Surface").

On Snow Base Surface

The preferred pulling vehicle used on a snow-covered surface for pulling a user who wears a pair of snow skis, snow board, or other sliding device under the body, employs ribbed tires or "belt tracks" instead of the slick drive tires 28a & 28b. Belt tracks would be of similar construction and material as to those found on snowmobiles such that a single belt would wrap around two or more wheels, whereby the two wheels inside the single belt track are positioned on a line which runs parallel to the direction of travel. The snow base pulling vehicle uses the same steering method as described above: specifically, the arms and shoulders are used to push and pull the drag poles 54 fore and aft, with one pole used for rotational stability. This method can spin the entire vehicle on a vertical axis located mid span of the mainframe connecting bar 64 without requiring the use of a tiller-type control.

In the event that the user travels up steep slopes or over long distances, a harness or support mechanism (not shown) may be employed to pull the user from a point other than from the hands. The support harness attaches to the frame of the vehicle on connecting bar 64 at two screw-hole harness attachment points 66 and pulls from the arms, shoulders or waist. It should have a quick release mechanism to disconnect the user from the vehicle at any time.

On Ice, Snow and Dirt Base Surface

In an environment where ice, hard snow, dirt or sand is traversed by the pulling vehicle, the drive wheels 28a & 28b may be of the type equipped with tire studs or knobs to provide an aggressive means of traction between the tire and base surface. The user wears skis, ice skates, wheeled or tired skates, snow or skate boards or any other platform that is used to carry the body, including feet, i.e., when the pulling vehicle supports a rack or carrying compartment, it is ideal for carrying groceries or packing equipment over groomed camping trails.

For off-road and high-performance use, the pulling vehicle may be equipped with a fully suspended chassis for improved stability and damping against vibrations that might disrupt drive, steering and braking.

Conclusions, Ramifications and Scope of Invention

A vehicle according to the invention is a universal, compact, portable, powerful and high-performance recreation and commuting machine. It can pull the user over a number of base surfaces in the most efficient manner for both machine and operator. Two independent and freely movable "ski poles" or drag poles, act as the steering wheel and transmit the machine's pulling force to the driver.

The pulling vehicle is especially suited for the skier or inline skater because it is specifically designed to simulate a skier's correct body movements while traveling on a base surface (the inline skater can almost identically mimic a skier's movements when he/she has an external means of acceleration, i.e., the pulling transportation vehicle).

Two ski poles attach to the vehicle in a manner such that at least one of the pole handles or grips is free to move in the lateral and vertical planes, but neither serves as a tiller.

The invention has now been explained with reference to specific embodiments. Other embodiments will be apparent to those of ordinary skill in the art. Therefore it is not intended that this invention be limited, except as indicated by the appended claims.

What is claimed is:

1. A personal towing vehicle for towing a user comprising:

a chassis;

a first drag pole and a second drag pole, each drag pole having a grip end with a ski-pole-like grip, the first drag pole being coupled to the chassis through a universal joint, the second drag pole being coupled to the chassis through a joint permitting free movement only in a lateral direction, such that each drag pole is freely movable at the grip end in at least lateral directions in a plane normal to a travel direction without impacting steering, while said second drag pole imparts stability to said chassis, the grip comprising means for steering the vehicle without restricting lateral hand and torso movement of the user;

at least two ground contact points, including at least one means mounted to said chassis for driving said vehicle; and means mounted to said chassis and coupled to said driving means for powering said chassis and pulling said user solely by manipulation of each drag pole.

2. The vehicle according to claim 1 wherein said driving means comprises a drive wheel.

3. The vehicle according to claim 1 wherein said driving means comprises first and second drive wheels mounted in parallel along an axle across said chassis, said joints being respectively mounted to said chassis adjacent said first and second drive wheels in order to permit steering by direct manual differential loading control of said drive wheels.

4. The vehicle according to claim 1 further including:

an electric motor set for providing independent power to each drive track.

5. The vehicle according to claim 4 further including means for controlling motor speed coupled in handles to each said drag pole for additional controlled steering of said drive wheels.

6. The vehicle according to claim 1 further including means for connecting a drag harness to said chassis, the drag harness for attaching to a user's torso, so that loading through the drag poles to a user's arms can be reduced while providing additional mechanical dragged-load-bearing capability.

7. The vehicle according to claim 1 wherein said powering means comprises a motor generator set, for powering and braking said drive means by means of regenerative braking, said regenerative braking for charging an electric power source of said powering means.

* * * * *